United States Patent [19]

Sasaki

[11] Patent Number: 4,601,870
[45] Date of Patent: Jul. 22, 1986

[54] INJECTION MOLDING PROCESS
[75] Inventor: Nobuyoshi Sasaki, Yokohama, Japan
[73] Assignee: M.C.L. Co., Ltd., Kanagawa, Japan
[21] Appl. No.: 603,114
[22] Filed: Apr. 23, 1984
[30] Foreign Application Priority Data Apr. 27, 1983 [JP] Japan ................................. 58-72975
Apr. 27, 1983 [JP] Japan ................................. 58-72976

[51] Int. Cl.$^4$ ............................................. B29C 45/57
[52] U.S. Cl. ................................... 264/572; 264/513; 264/328.1; 264/328.16
[58] Field of Search ............... 264/512, 513, 537, 572, 264/328.1, 328.16; 425/535, 547

[56] References Cited

U.S. PATENT DOCUMENTS

| 2,372,630 | 3/1945 | Smith | 264/328.16 |
| 4,101,617 | 7/1978 | Friederich | 264/572 |
| 4,106,887 | 8/1978 | Yasuike, et al. | 425/549 |

FOREIGN PATENT DOCUMENTS 2106546 8/1972 Fed. Rep. of Germany .

Primary Examiner—Donald Czaja
Assistant Examiner—V. Fischbach
Attorney, Agent, or Firm—Laff, Whitesel, Conte & Saret

[57] ABSTRACT

An injection molding process for molding an article having accurate dimensions without sink marks includes the step of feeding high pressure air into the core portion of a shell or solid molded mass formed by the preceding injection molding step. Preferably, the wax material is injected into a mold cavity through a throttled inlet port to flow thereinto as a vigorous turbulent flow. A separate flow line is provided for feeding high pressure air in the preferred embodiment. More preferably, the volume of injected wax is substantially smaller than the volume of mold cavity.

4 Claims, 3 Drawing Figures

INJECTION MOLDING PROCESS

BACKGROUND OF THE INVENTION:

1. Field of Art;

The present invention relates to a process and apparatus for molding lost wax masters used in the investment casting or for molding articles of wax through the injection molding. More particularly, it relates to an injection molding process and apparatus for molding articles having hollow core portions.

2. Prior Art;

Injection molding processes have been widely used not only for the production of molded articles made of various thermoplastic resins but also for the production of lost wax masters (hereinafter referred to as wax models) used in the investment casting process. Since the molded products, such as wax masters, tend to shrink during the cooling step in or after the injection molding process, each molding cavity has the dimensions slightly larger than those of the finished product molded therein. However, due to this shrinkage resulted by cooling, the surface of the wax mold or molded product is often caved in to suffer so-called "sink mark" particularly when the molded product is relatively thick and has large surface area or areas. The dimensional stability of the finished product is seriously affected by the formation of "sink mark" to make it difficult to mold the wax model having accurate dimensions.

In conventional injection molding processes, the wall thickness of the wax or other thermoplastic materials is decreased as thin as possible by embedding an inlay made of another thermoplastic material or by incorporating a core within the mold cavity. However, these known methods are disadvantageous in that the producibilities thereof are poor and hence they are not suited for mass production.

In order to eliminate the need of embedding an inlay or core made of another material, an improved process has been proposed wherein a molten thermoplastic material is injected in each mold cavity and then high pressure air is fed in each mold cavity to back up the mass of plastic material during the cooling step to prevent shrinkage of molded article due to cooling. The specification of Japanese Patent application No. 123944/1974 discloses a nozzle assembly suited for this purpose. However, the nozzle assembly disclosed by the preceding patent application is not fully satisfactory in that the volume of air flowing into the mold cavity is too small since air is fed into the mold cavity previously filled with a pressurized thermoplastic material, and in that the air supply passage is frequently blocked by the cooled and solidified thermoplastic material. It is, therefore, required to increase the air pressure to a very high level in order to feed sufficient volume of air in each mold cavity.

OBJECTS AND SUMMARY OF THE INVENTION:

An object of this invention is to provide an injection molding process for molding a wax model or a molded article of other thermoplastic material without the fear of formation of sink mark.

Another object of this invention is to provide an injection molding process for molding a wax model or product article having accurate dimensions.

A further object of this invention is to provide an injection molding process suited for mass production of molded articles having hollow core portion.

In accordance with the first aspect of the invention, each mold cavity is communicated with a throttled inlet port through which a molten wax is injected into a mold cooled to a temperature lower than the melting point of the wax, whereby the injection speed is significantly increased to generate turbulent flow within the mold cavity to allow the injected wax to adhere on the overall interior surface of the mold to form a shell of uniform thickness, and then high pressure air is fed in the mold cavity to back up the thus formed shell until it is solidified. More specifically, the invention provides a process for molding an article from wax, comprising the step of cooling a mold having a hollow core portion defining a mold cavity communicating with a sprue runner. The cooling is carried out through a throttled injection port, at a temperature which is lower than the melting point of the wax. While it is cooled and at a low viscosity, wax is injected into the mold cavity through the throttled injection port. The molten wax adheres onto the interior surface of the mold to form a shell. Then, the pressure in the throttled injection port is reduced in the hollow core portion of the shell. Next, a high pressure air is fed into the hollow core portion of the shell until the wax is completely solidified.

DESCRIPTION OF THE DRAWINGS

The present invention will be fully understood from the following description with reference to the appended drawings, in which.

DESCRIPTION OF PREFERRED EMBODIMENT

Figure 1:
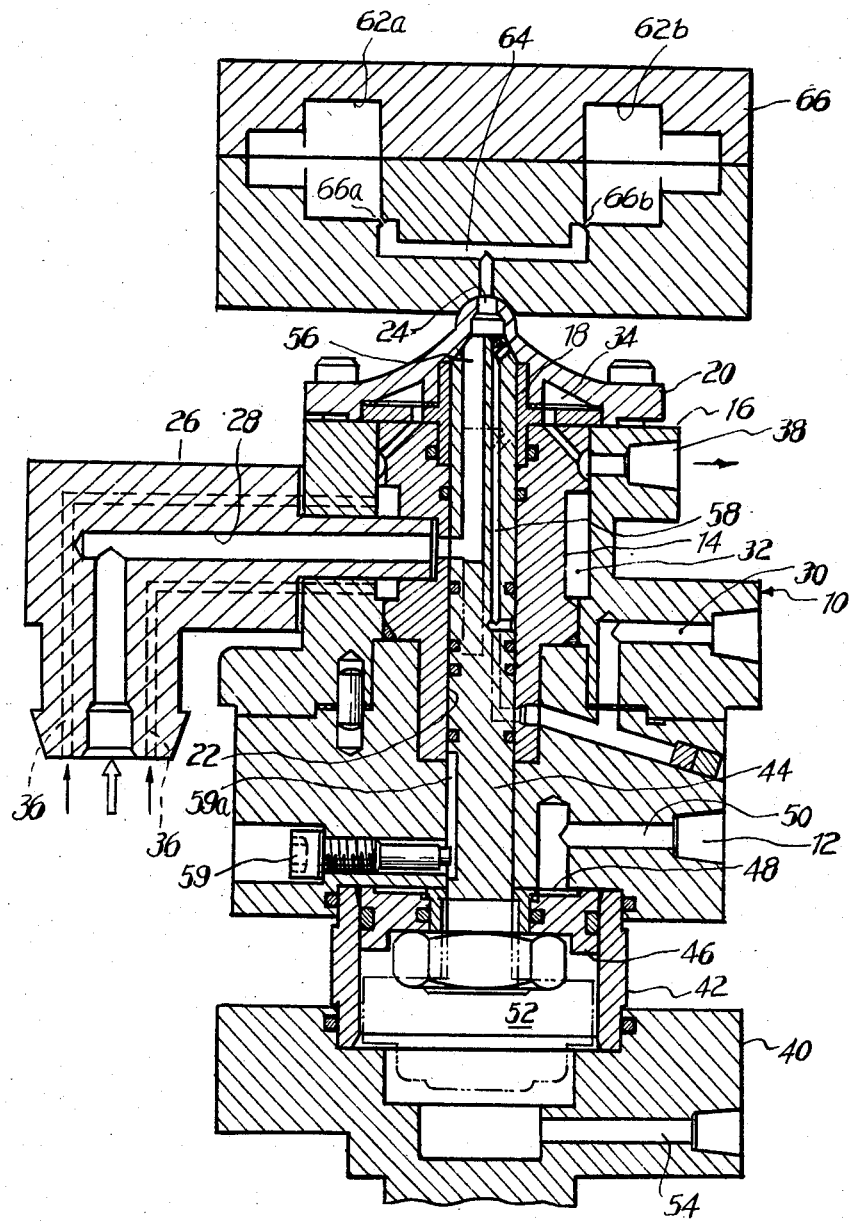
FIG. 1 is a sectional view showing an embodiment of the nozzle assembly according to the invention.

Initially referring to FIG. 1, the construction of the nozzle assembly of the invention will be described.

The nozzle assembly has a body, generally denoted by reference numeral 10, which includes a casing 12, a bearing 14, a housing 16, a bushing 18 and a nozzle cover 20. A hollow cylindrical bore 22 extends in the longitudinal direction of the body through the bearing 14 and the casing 12. The upper opening of the cylindrical bore 22 is in communication with an outlet port 24 formed at the substantial center of the nozzle cover 20. The diameter of the outlet port 24 is smaller than that of the cylindrical bore 22. A fitting 26 having a general section of the letter L is attached to the housing 16, and has a first feed line 28 for supplying molten wax. The first feed line 28 extends through the housing 16 and the bearing 14 to open to the cylindrical bore 22. On the other hand, a second feed line 30 for feeding high pressure air is formed through the bearing 16 to open to the cylindrical bore 22.

A warm water passage 32 is formed between the housing 16 and the bearing 14, and another warm water passage 34 is formed between the bushing 18 and the nozzle cover 20. Warm water supplied under pressure through a plurality of warm water supply passages 36 surrounding the first feed line 28 of the generally L-shaped fitting 26 flows through the warm water passages 32 and 34 to be discharged from a warm water discharge port 38. The discharged warm water is again heated by a not-shown heater to be recirculated through the passages 36, 32 and 34, so that the portions of the body through which the molten wax flows are heated to a temperature higher than the melting point of the wax.

A cylinder 42 is interposed between the lower face of the casing 12 and a base plate 40.

Reference numeral 44 designates a plunger slidingly inserted in the cylindrical bore 22 and having the lower end connected to a piston 46 which is slidingly moved in the cylinder 42. An upper chamber 48 is defined by the interior wall of the cylinder 42 and the upper face of the piston 46, and a lower chamber 52 is defined by the interior wall of the cylinder 42 and the lower face of the piston 46. The upper chamber 48 is communicated with a conduit 50, and the lower chamber 52 is communicated with another conduit 54. The piston 46 and the plunger 44 are lowered to the position shown by the phantom line in FIG. 1 as actuating air is fed through the conduit 50 to the upper chamber 52, and the piston 46 and the plunger 44 are raised to the position shown by the solid line in FIG. 1 as actuating air is fed through the conduit 54 to the lower chamber 52.

The plunger 44 is formed with a first passageway 56 for passing therethrough the molten wax and a separate second passageway 58 for passing therethrough high pressure air. The first passageway 56 is communication with the first feed line 28 to pass the molten wax to the outlet port 24 as the plunger 44 is raised to the first position as shown in FIGS. 1 and 2. At the time when the plunger 44 is held in the first position, the second passageway 58 is disconnected from the second feed line 30 to be sealingly closed by the interior wall defining the cylindrical bore 22. The upper opening of the second passageway 58 is closed by a ledge provided on the inside face or the nozzle cover 20 for this purpose. As the plunger 44 is lowered to the second position as shown in FIG. 3, the first passageway 56 is disconnected from the first feed line 28 and the second passageway 58 is communication with the second feed line 30 for feeding high pressure air. Reference numeral 59 in FIG. 1 designates a guide pin having one end loosely inserted in an elongated groove 59a formed along the longitudinal direction of the plunger 44 to prevent the plunger 44 from rotation.

Reference numeral 60 designates a splittable mold having two mold cavities 62a and 62b which are connected with each other by a sprue runner 64 communicating with the outlet port 24 of the nozzle assembly. The mold cavities 62a and 62b are communicated with the sprue runner 64 through throttled injection ports 66a and 66b, respectively. The mold 60 is assembled with the body 10 so that the sprue runner 64 communicates with the outlet port 24 of the nozzle assembly. Cooling water is circulated through a cooling water passage (not shown) formed through the mold 60 to cool the mold 60 below the melting temperature of the wax.

The operation of the nozzle assembly and the steps of the process according to the present invention will now be described with reference to FIGS. 2 and 3. As the plunger 44 is raised to the first position, i.e. the position shown in FIG. 2, by supplying acruating air through the conduit 54, the upper and lower end openings of the second passageway 58 is closed within the cylindrical bore 22. The molten wax is supplied under pressure from the first feed line 28 to be passed through the first wax passageway 56, the outlet port 24 and the sprue runner 64, and injected through the throttled injection ports 66a and 66b into the mold cavities 62a and 62b. As passing through the throttled injection ports 66a and 66b, the flow speed of the molten wax is significantly increased to generate turbulent flow. Since the mold 60 is cooled to a temperature lower than the solidification temperature of the wax, the wax adhering on the walls defining each mold cavity is immediately solidified. As the molten wax is injected in each mold cavity while forming a turbulent flow flowing at a very high speed, solidification of wax propagates from the portions contacting to the wall defining the mold cavity toward the core portion so that a shell-like solidified mass of uniform thickness is formed while leaving the wax at the vicinity of hollow core portion 68 in a yet fluidized condition.

At the time when the volume of the injected wax reaches the pre-set level, for example about one third to two third ($\frac{1}{3}$ to $\frac{2}{3}$) of the volume of each mold cavity 62, the actuating air supply through the conduit 54 is shut off and actuating air is supplied through the conduit to the lower chamber 52 by changing the connection by means of an electromagnetic valve (not shown), whereby the plunger 44 begins to move downward. During the downward stroke of the plunger 44, the first wax passageway 56 is disconnected from the first feed line 28 so that wax supply to the cavities 62 is stopped. As the plunger 44 is lowered further, while both of the first and second passageways 56 and 58 are held in the shut-off condition, the pressure in the sprue runner 64 and the hollow core portions 68 is dropped correspondingly. When the plunger is lowered to the second position, i.e. the position shown in FIG. 3, the second passageway 58 is communicated with the second feed line 30 for feeding high pressure air, whereupon pressurized air flows through the sprue runner 64 and the throttled injection ports 66 into the hollow core portions 68 surrounded by the solidified wax shell.

In the conventional process, the wax contained in the sprue runner 64 is initially solidified to limit or even block the flow of high pressure air. However, in the process of the invention wherein the aforementioned nozzle assembly is used, the pressure in the hollow core portions 68 is gradually dropped as the plunger 44 moves downward so that the pressure difference between the pressure in the second feed line 30 and the pressure in the hollow core portions 68 reaches the maximum level. As a result, at a moment when the sprue runner 64 is in communication with the second feed line 30 through the second passageway 58, a large amount of pressurized air flows into the sprue runner 64 vigorously at a relatively increased rate to ensure formation of narrow flow passage for high pressure air throughout the yet fluidized mass of molten wax contained in the sprue runner 64 and the throttled injection ports 66. Sufficient back-up air pressure is, thus, developed within the hollow core portions 68 since a sufficient amount of high pressure air is fed through the second feed line 30 and the second passageway 58 into the hollow core portions 68.

The wax shell in each mold cavity 62 is completely solidified while applying high back up pressure from the hollow core portion 68. Wax models having accurate dimensions can be prepared efficiently without the fear of formation of sink mark. The mold 60 is then split and the molded wax masters are removed therefrom. Since the hollow core portion 68 of each molded product communicates with the atmosphere through the flow passage through with the high pressure back up air has flown, the pressure in the hollow core portion 68 is equal to the atmospheric pressure after the molded product is removed from the mold 60. Accordingly, there is no risk that the molded wax master is broken or otherwise adversely affected by cooling.

The invention will now be illustrated with reference to the following example.

EXAMPLE

Figure 2:
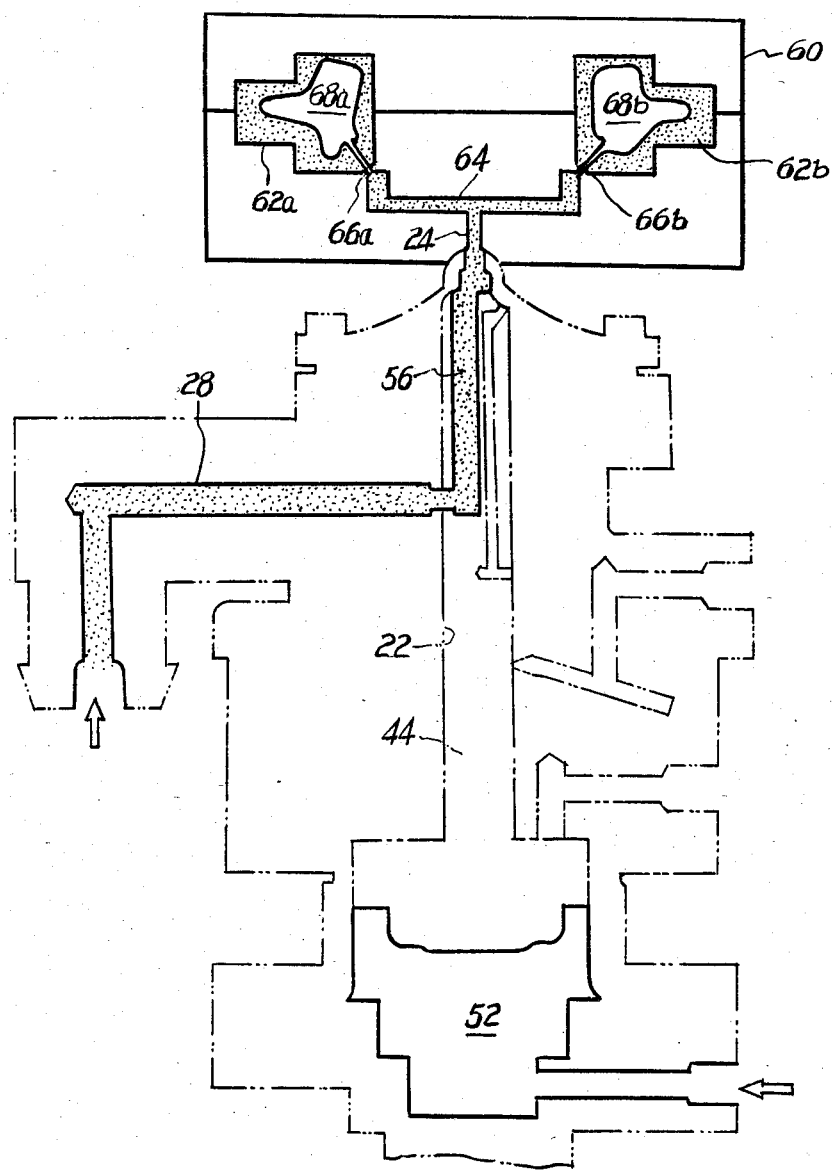
FIG. 2 is a schematic illustration showing the step of injecting the molten wax into the molds.
Figure 3:
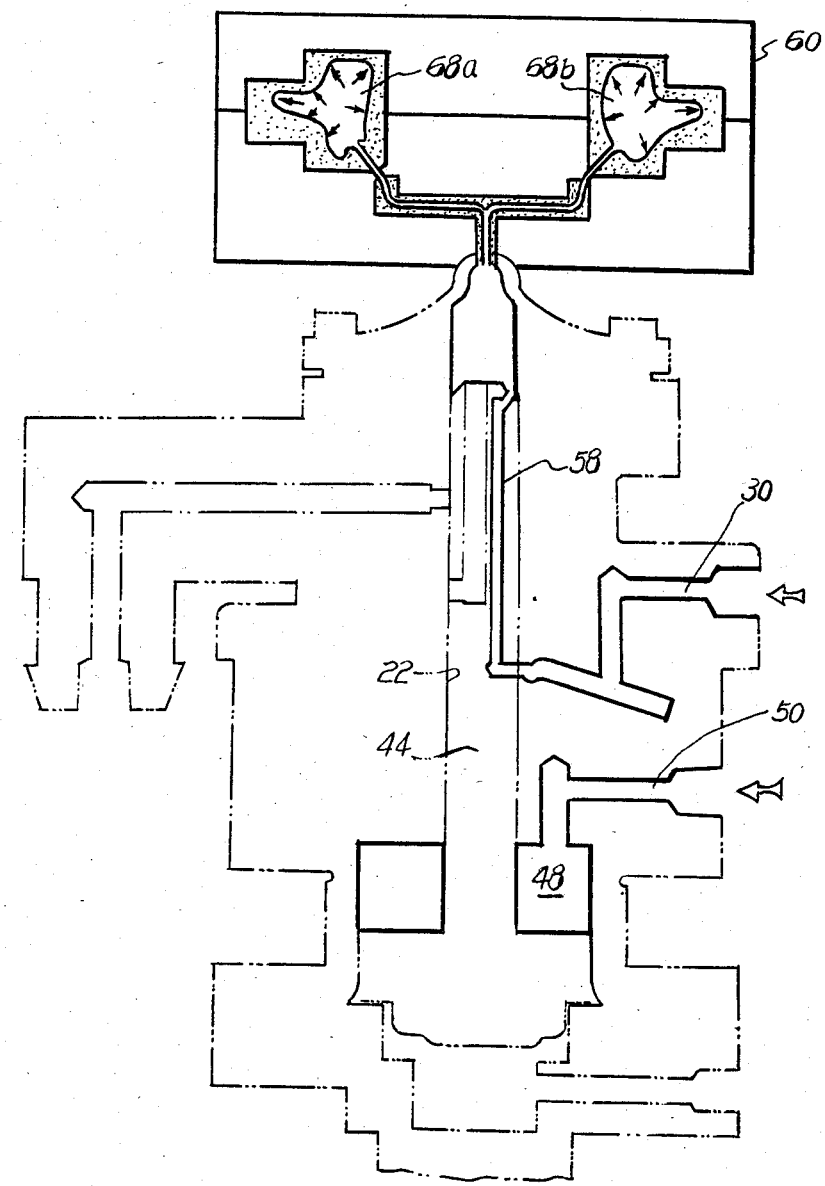
FIG. 3 is a schematic illustration showing the step of feeding high pressure air into hollow core portions of the mold cavities.

Using the nozzle assembly shown in FIGS. 1 to 3, a montan wax model having a volume of about 21.4 cm$^3$ (including the volume of hollow core portion) was prepared in accordance with the process of the invention. The volume of hollow core portion was pre-set to occupy about one tenth to one fifth (1/10 to 1/5) of the total volume of the finished product. The diameter of the throttled injection port 66 was about 1.0 mm.

The plunger 44 is raised to the first position, the position shown in FIGS. 1 and 2, and molten montan wax was injected in a mold cavity at an injection rate of about 7.14 cm$^3$/sec for about 3 seconds. The temperature distribution throughout the flow passage for the montan wax was within the range of 68° to 75° C., and the mold was continuously cooled by recirculating cold water.

The injection speed of the wax flowing through the throttled injection port 66 was calculated to be about 900 cm$^3$/sec.

After the completion of injection, the plunger 44 is lowered to the second position, the position shown in FIG. 3, and high pressure air was fed through the second feed line 30 and the second passageway 58 into the half-solidified mass of montan wax. The pressure of air was 6.00 kg/cm$^2$, and the pressure of air was maintained at that level until the wax in the mold cavity was completely solidified, followed by removal of molded product.

The molded products prepared by repeated operation cycles were satisfactory in that they had accurate dimensions and were free of sink mark or similar defect.

Although the invention has been described with reference to a preferred embodiment wherein wax models used for lost wax casting are prepared, the process and the nozzle assembly according to the invention may be used for the production of molded articles from any thermoplastic resins, such as polystyrene or polyethylene.

Although the throttled injection port 66 is positioned at the bottom corner of each cavity in the illustrated embodiment since the molten wax once falling down to the bottom portion of the mold cavity may be again sprayed upward by the incoming flow of molten wax to facilitate formation of a shell having more uniform wall thickness, it should be appreciated that the objects of the invention may be attained by changing the position of the throttled injection port 66.

Likewise, in the illustrated embodiment, a relatively small volume of molten wax is injected into each mold cavity 62 to form a relatively large hollow core portion 68. The consumption of wax can be, thus, decreased to have an additional cost-saving effect. However, without departing from the broad concept of the invention, each mold cavity may be filled completely with the molten material, followed by feeding of high pressure air for developing high back up pressure within the hollow core portion spontaneously formed by shrinkage due to cooling.

What is claimed is:

1. A process for molding an article from wax, comprising the steps of cooling a mold having a hollow core portion defining a mold cavity communicating with a sprue runner through a single throttled injection port, said cooling being to a temperature which is lower than the melting point of said wax, injecting said wax while in a molten and low viscosity state into said mold cavity of said mold while it is cooled in response to said cooling step, said injection being through said throttled injection port to allow said molten wax to adhere onto the interior surface of said mold to form a shell, reducing the pressure in said hollow core portion of said shell through said throttled injection port, and then feeding high pressure air into thet hollow core portion of said shell to back up said shell through said throttled injection port until said wax is completely solidified.

2. The process according to claim 1, wherein the volume of injected wax is substantially smaller than the volume of said mold cavity to leave a hollow core portion at the center of the mold cavity.

3. The process according to claim 1, wherein said high pressure air is fed through a flow passage separate from the flow passage for the molten wax.

4. The process according to claim 2, wherein said high pressure air is fed through a flow passage separate from the flow passage for the molten wax.

* * * * *